United States Patent
Wang et al.

(10) Patent No.: US 7,159,901 B2
(45) Date of Patent: Jan. 9, 2007

(54) DEPLOYABLE KNEE BOLSTER FOR INSTRUMENT PANEL

(75) Inventors: Jenne-Tai Wang, Troy, MI (US); Gary L Jones, Farmington Hills, MI (US); Joseph D McCleary, Clinton Township, MI (US); Ching-Shan Cheng, Canton, MI (US)

(73) Assignee: General Motors Corporation, Detroit, MI (US)

( * ) Notice: Subject to any disclaimer, the term of this patent is extended or adjusted under 35 U.S.C. 154(b) by 3 days.

(21) Appl. No.: 10/457,940

(22) Filed: Jun. 10, 2003

(65) Prior Publication Data
US 2004/0251670 A1 Dec. 16, 2004

(51) Int. Cl.
B60R 21/045 (2006.01)
B60R 21/04 (2006.01)
(52) U.S. Cl. .................... 280/752; 280/753
(58) Field of Classification Search ............ 280/753, 280/752, 751; 188/372, 374
See application file for complete search history.

(56) References Cited

U.S. PATENT DOCUMENTS

| | | | | |
|---|---|---|---|---|
| 3,811,701 A | * | 5/1974 | Grime | 280/753 |
| 4,023,643 A | * | 5/1977 | Bagley, Jr. | 280/753 |
| 4,709,943 A | * | 12/1987 | Yoshimura et al. | 280/751 |
| 4,978,136 A | * | 12/1990 | Tomita et al. | 280/751 |
| 5,358,275 A | * | 10/1994 | Fohl | 280/806 |
| 5,518,270 A | * | 5/1996 | Hanada et al. | 280/751 |
| 5,967,573 A | * | 10/1999 | Wang | 293/119 |
| 6,039,353 A | * | 3/2000 | Bauer et al. | 280/806 |
| 6,076,856 A | * | 6/2000 | Wang et al. | 280/806 |
| 6,283,508 B1 | * | 9/2001 | Nouwynck et al. | 280/753 |
| 6,302,458 B1 | * | 10/2001 | Wang et al. | 293/132 |
| 6,464,246 B1 | | 10/2002 | Bayley | |
| 6,533,316 B1 | | 3/2003 | Breed et al. | |
| 6,536,802 B1 | | 3/2003 | Sutherland et al. | |
| 6,641,166 B1 | * | 11/2003 | Browne et al. | 280/752 |
| 6,846,015 B1 | * | 1/2005 | Meduvsky et al. | 280/753 |
| 2003/0001372 A1 | * | 1/2003 | Browne et al | 280/751 |

FOREIGN PATENT DOCUMENTS

JP   2002200949 A  * 7/2002

\* cited by examiner

*Primary Examiner*—Paul N. Dickson
*Assistant Examiner*—Joselynn Y. Sliteris
(74) *Attorney, Agent, or Firm*—Kathryn A. Marra

(57) ABSTRACT

An energy absorbing knee bolster for use in an interior of a vehicle is disclosed. An energy absorbing support structure is configured to support an instrument panel within a vehicle. The energy absorbing structure has a deployable tubular mechanism for absorbing occupant impact energy and an impact plate coupled to the tubular mechanism for absorbing occupant energy. An energy absorbing locking mechanism is disposed between the impact plate and the support structure. The locking mechanism is configured to encourage the collapse of the tubular means for absorbing energy in a telescopic fashion.

17 Claims, 5 Drawing Sheets

DEPLOYABLE KNEE BOLSTER FOR INSTRUMENT PANEL

FIELD OF THE INVENTION

The present invention relates to an instrument panel reinforcement structure for motor vehicles, and more particularly to a deployable support structure for a knee bolster.

BACKGROUND OF THE INVENTION

The individual components of a restraint system are preferably designed with the view of the other components in the restraint system, as well as the specific vehicle geometry. For example, the stiffness of an airbag cushion may be designed with view of the stiffness of a vehicle's steering column, windshield slope, and instrument panel stiffness. As such, it is very desirable during the development of a restraint system to have components which have easily modifiable engineering properties.

One integral component in some restraint systems is the lower portion of the instrument panel or knee bolster. In this regard, the knee bolster can function to provide various levels of occupant protection. The interaction of the knee bolster with an occupant as well as the displacement of the knee bolster with respect to the vehicle can help to determine the occupant kinematics.

As such, it would be desirable to have a knee bolster for use in a restraint system which has engineering properties that can be easily tuned based upon vehicle geometry, occupant loading, and occupant displacement. It also would be desirable to provide a deployable knee bolster which provides a steady state loading of an occupant's femurs. It is an object to the present invention to provide an instrument panel a highly tunable deployable knee bolster which provides steady state loading of an occupant's lower extremities during a crash event.

SUMMARY OF THE INVENTION

In accordance with the teachings of the present invention, an energy absorbing knee bolster for use in an interior of a vehicle is disclosed. The knee bolster is configured to absorb energy from the vehicle's occupants during a rapid vehicle deceleration. The knee bolster is formed of a deployable cylinder which is welded to an impact plate on its first end and is slidably positioned within a cylinder which is coupled to a vehicle's cross-car beam. A gas generator is fluidly coupled to the cylinder and functions to force the impact plate into the occupant compartment. The collapsible cylinder is configured to axially collapse at a predetermined force when impacted by a moving occupant.

In one preferred embodiment, a knee bolster having a deployable cylinder with a gas generator fluidly coupled to the cylinder is disclosed. An impact plate and locking mechanism are coupled to the cylinder. The deployable cylinder is configured to axially collapse at a predetermined force when impacted by the moving occupant.

In another embodiment of the invention, an energy absorbing support structure configured to support an instrument panel within a vehicle is disclosed. The energy absorbing structure has a deployable tubular member for absorbing occupant impact energy and an impact plate coupled to said tubular member for absorbing occupant energy. An energy absorbing locking mechanism is disposed between the impact plate and the support structure. The energy absorbing locking mechanism is configured to encourage the collapse of the tubular member for absorbing energy in a telescopic fashion.

In yet another embodiment of the invention, a cross-car beam is disclosed. The cross car beam is formed by a first member, which is disposed between two points with a vehicle compartment and a deployable piston having first and second ends formed within a cylinder. The second end of the deployable piston is coupled to an energy absorbing locking mechanism. An impact plate is coupled to the first end of the deployable piston. The energy absorbing locking mechanism has a plurality of bearing members configured to plastically deform a portion of the cylinder. A collapsible piston is configured to axially collapse at a predetermined force when impacted by a vehicle occupant.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
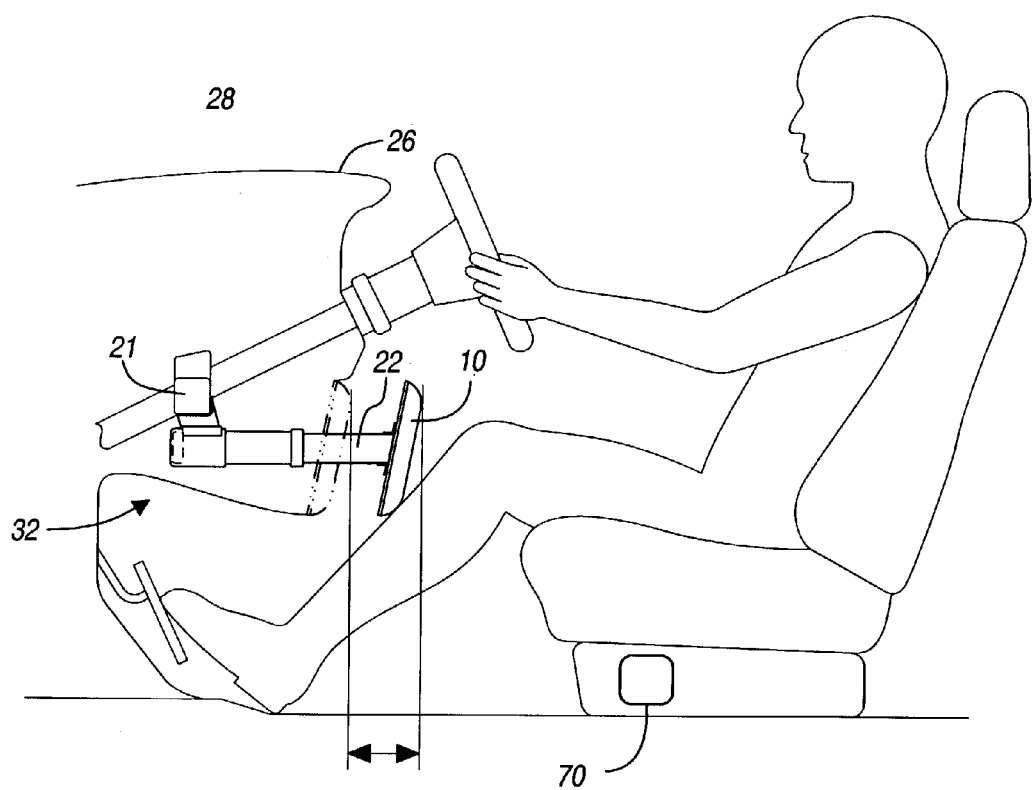
FIG. 1 represents an interior view of the vehicle utilizing the deployable knee bolster according the present invention.

The following description of the preferred embodiment is merely exemplary in nature and is in no way intended to limit the invention, its application, or uses.

FIGS. 1–5 represent a deployable knee bolster according to the teachings of the present invention. The deployable knee bolster 10 is formed of four general components, a piston 12 within a fixed exterior tube 14, an impact plate 16, and a locking mechanism 18. Generally, the impact plate 16 is welded to a first end 20 of a tubular member 22 coupled to the piston 12.

Figure 2:
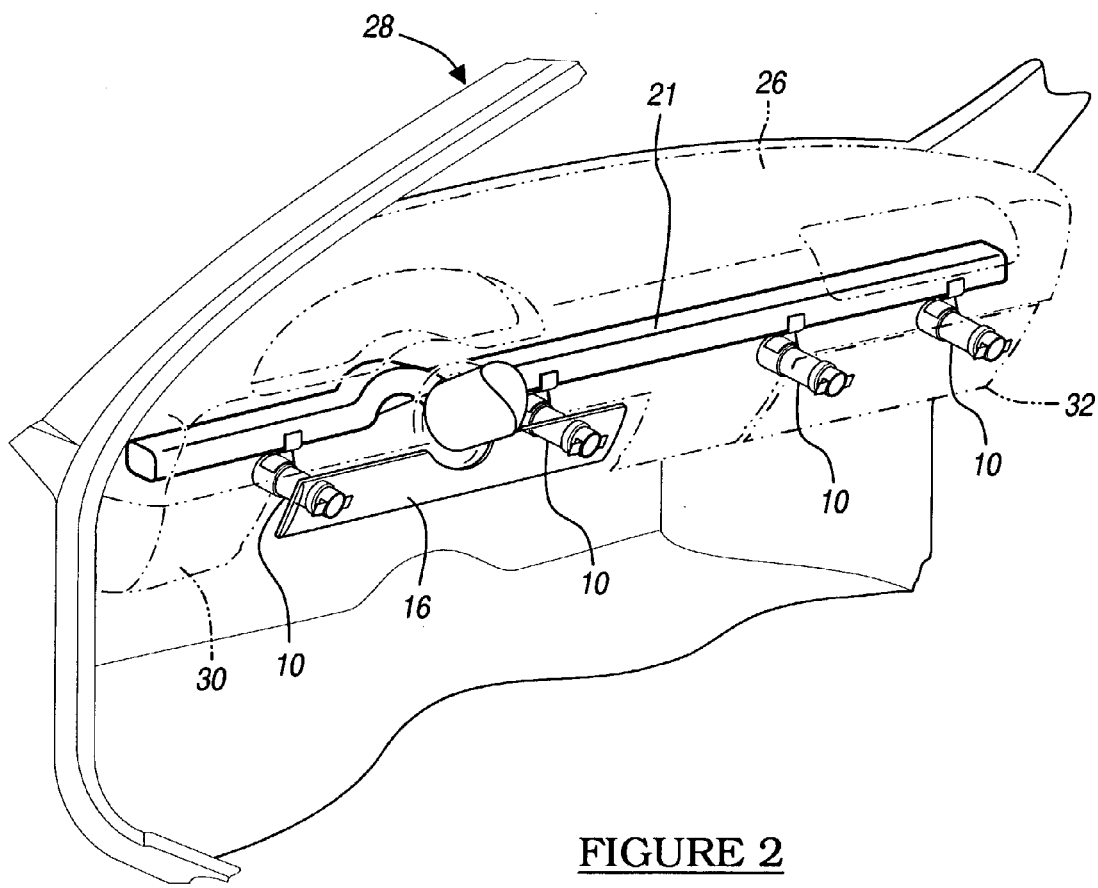
FIG. 2 represents a perspective cross-sectional view of an instrument panel support structure utilizing the deployable knee bolster of the present invention.

As best seen in FIGS. 1 and 2, the deployable knee bolster 10 is coupled to a cross-car beam 21 which supports an instrument panel 26 within a vehicle 28. The instrument panel 26 has a driver and passenger knee bolster 30 and 32, which are configured to absorb energy from a occupant's femurs during a vehicle deceleration. It is envisioned that the passenger's knee bolster 32 can encompass a portion of the vehicle's glovebox.

Figure 3:
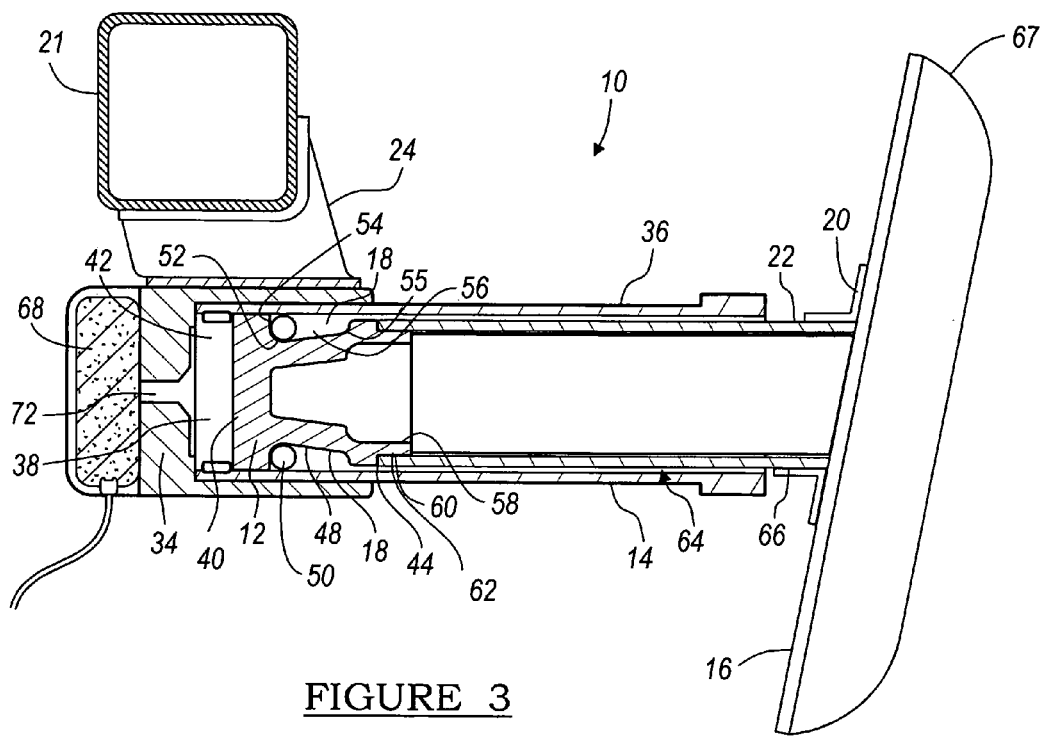
FIG. 3 represents a cross-sectional view of the deployable knee bolster in an undeployed condition.
Figure 4:
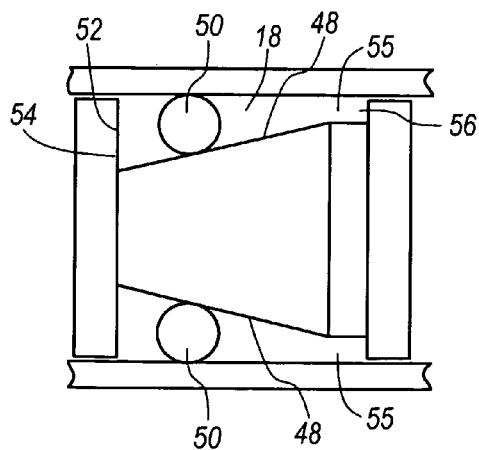
FIG. 4 represents a locking member according to one embodiment of the present invention.

FIG. 3 represents a cross-sectional view of the deployable knee bolster 10 in an undeployed condition. The fixed exterior tube 14 is formed of a generally cylindrical housing 34, which is coupled to a outer cylindrical tube 36 to form a piston cavity 38. The cylindrical housing 34 is coupled to the vehicle cross-car beam 21 using a bracket 24, which functions to transfer occupant deceleration energy into the cross-car beam 21.

Slidably disposed within the cavity 38 is the piston 12. The piston 12 has a circular surface 40 defined on its proximal end 42 and a cylindrical side surface 44. Defined within the cylindrical side surface 44 is a locking mechanism 18, the function of which will be detailed below. The locking mechanism 18 is formed of at least one wedged-shape ramp 48 defining a ramp-shaped cavity and at least one corresponding bearing element 50. It is envisioned that the bearing element 50 can be spherical or be a wedge-shape. The wedge-shape ramp 48 has a proximal end 52 defined in a first cavity end 54 and a distal end 55 defining a second cavity end 56. The first cavity end 54 has a depth greater than the diameter of the bearing element 50, while the second cavity end 56 has a depth less than the diameter of the bearing element 50, but greater than zero. The depth of the second cavity end 56 can be adjusted along with the thickness and material of the outer cylinder tube 36 to adjust the compression load.

Disposed at the distal end 58 of the piston 12 is a threaded coupling 60, which is used to couple the piston 12 to the proximal end 62 of a cylindrical inner tube 64. The cylinder inner tube 64 is coupled at its distal end 66 via the impact plate 16. The impact plate 16 is a polymer or metal support positioned beneath a knee bolster fascia 67.

Fluidly coupled to the cylindrical housing 34 is a gas generator 68, which functions to produce gas in response to an electrical signal generated by a controller 70. Upon a rapid deceleration of the vehicle, the controller 70 produces a signal which causes the release of gas from the gas generator 68. As the gas travels down a passage 72, gas pressure imparts against the cylindrical surface 40 of the piston 12. It is envisioned that the gas generator 68 can be powered by a pyrotechnic propellant, liquid fuel, or a compressed gas.

The operation of the knee bolster 10 is based on the signal from the controller 70. Once the controller predicts that a deceleration event is in progress, electronic signals will be sent to the gas generator to extend the knee bolster 10 to a predetermined position. It is envisioned that approximately 0.07 kJ is necessary to deploy a 3 kg knee bolster about 100 mm in 30 msec.

Figure 5:
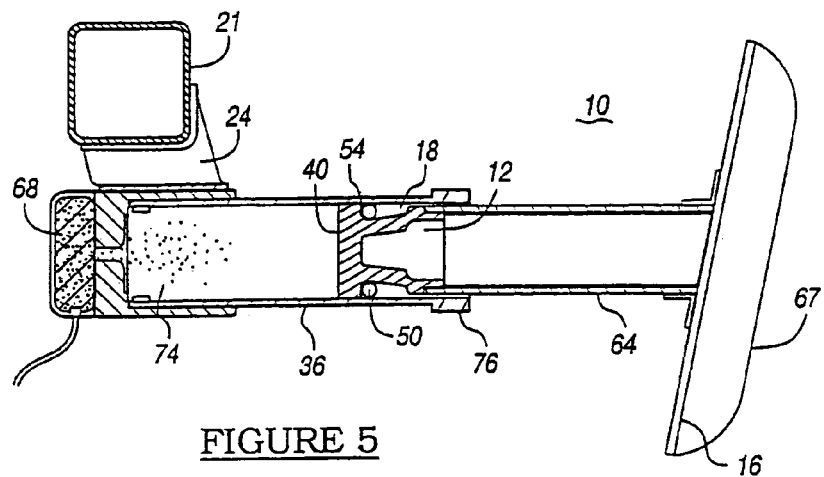
FIG. 5 represents a cross-sectional view of the deployable knee bolster in a deployed condition.

FIG. 5 represents the knee bolster 10 in its deployed condition. As can be seen, the piston 12 has been moved from its proximal end 74 of the cylindrical tube 36 to its distal end 76 of the cylindrical tube 36. Movement of the piston 12 within the cylindrical tube 36 causes the movement of the impact plate 16 a predetermined distance to the vehicle compartment. As can be seen, the bearing elements 50 are positioned of the first cavity end 54 of the locking mechanism 18.

Figure 6:
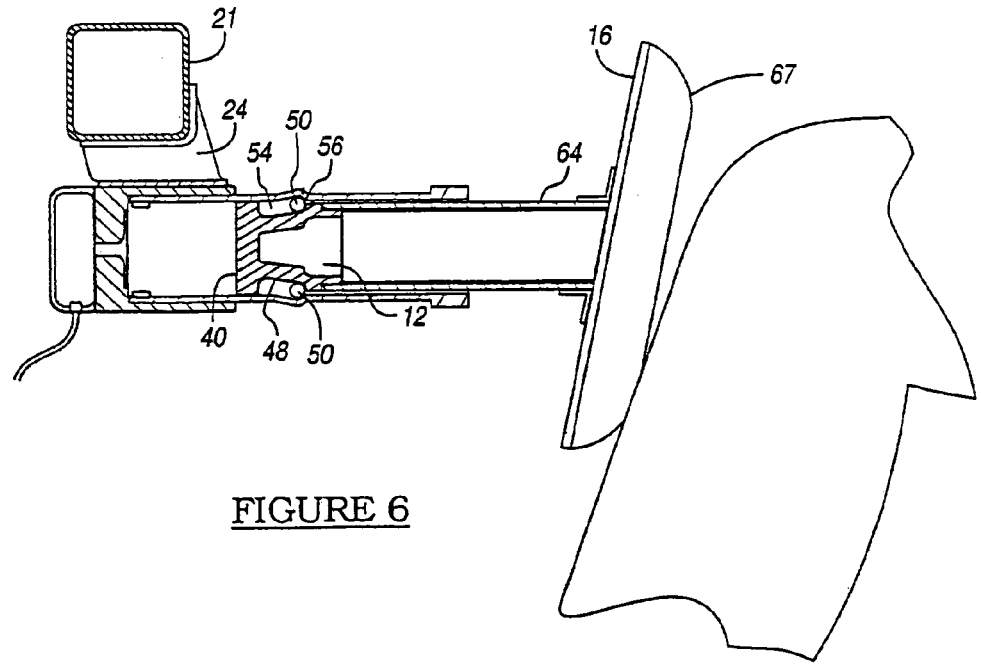
FIG. 6 represents a cross-sectional view of the deployable knee bolster in a collapsed condition.

FIG. 6 represents the knee bolster 10 being impacted by an occupant's leg. As the impact plate 16 is moved toward the front of the vehicle, the bearing element 50 moves from the first cavity end 54 toward the second cavity end 56 along the wedge-shape ramp 48. When loaded, such as the impact force exerted on the knee bolster surface, the level of the locking force can be designed by selecting a set of parameters, including the size and number of bearing elements 50, thickness and strength of the outer tube material, slope and angle and gap of the wedge-shape surface 48 and the inner surface of the fixed exterior tube 14, etc. Two different energy absorption modes can be achieved using the above locking mechanism. One mode will be to allow the inner tube 64 to buckle and be crushed to absorb energy. In this case, the mechanism must be designed to provide a locking force much higher than the tube crushing force. Another mode will allow the bearing elements 50 to plastically deform the inner wall of the outer tube to absorb energy. In this case, the mechanism must be designed to provide a locking force lower than the tube crushing force. It is envisioned that the collapse force would be engineered to help regulate the loads on an occupant's femurs while managing the occupant's kinematics during the deceleration events.

Figure 7:
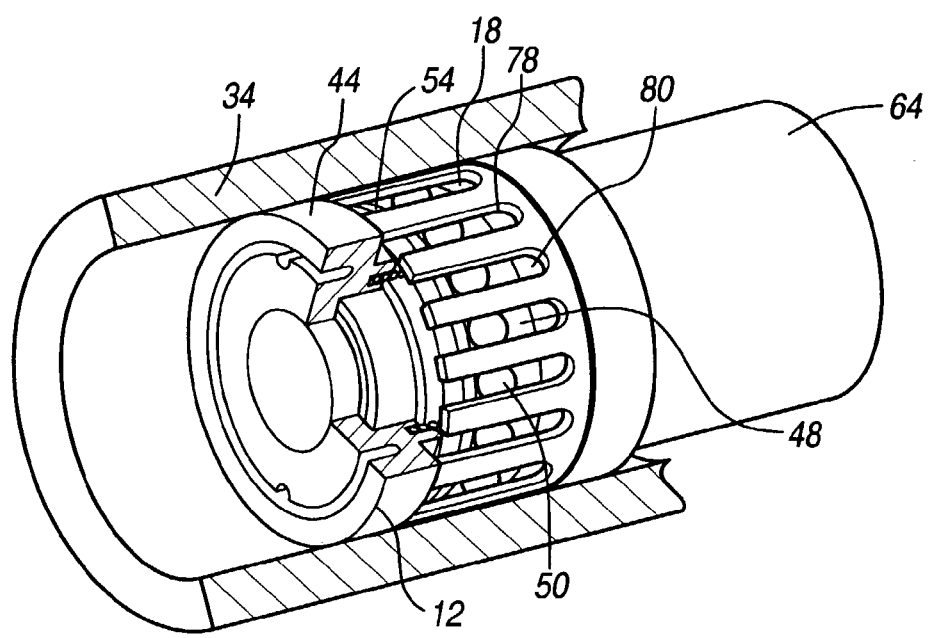
FIG. 7 represents a perspective cross-sectional view of a deployable cylinder according to an embodiment of the present invention.

FIG. 7 represents a knee bolster 10 according to an alternate embodiment of the present invention. Shown is the piston 12 disposed within the cylindrical housing 34. Defined on the cylindrical side surface 44 of the piston 12 are a plurality of locking mechanisms 18. As can be seen, the locking mechanisms 18 can have an outer sleeve 78 which define a plurality of bearing raceways 80 which guide the bearing elements 50 along the wedge shaped ramp 48.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A vehicle interior trim component comprising a cylinder having an interior wall, the interior wall defining a cavity;
    a single-use gas generator fluidly coupled to the cavity;
    a piston disposed within the cavity, the piston being movable from a first non-deployed position to a deployed position, the piston defining a ramp and having a locking mechanism; wherein said locking mechanism comprises at least one bearing element in contact with said ramp, where said locking mechanism is configured to restrain movement of the piston within the cavity from the deployed position toward the non-deployed position when the piston is subjected to a first compressive impact load during an impact event;
    an impact plate configured to interact with a knee of an occupant, said impact plate being coupled to the piston by a member, said cylinder configured to deform at a second compressive impact load, said first impact load being different than the second impact load; wherein a difference between said first impact load and said second impact load provides a relatively steady state load against the knees of said occupant during said impact event.

2. The interior trim component according to claim 1, further comprising a cylindrical tube defined between the piston and the impact plate.

3. The interior trim component according to claim 1 wherein the movable piston is further movable from the deployed position to a compressed position.

4. The interior trim component according to claim 3 wherein the locking mechanism comprises a bearing element disposed within a ramp-shaped cavity.

5. The interior trim component according to claim 4 wherein the bearing element is configured to engage the interior wall when the piston is moved from the deployed position to the compressed position.

6. The interior trim component according to claim 5 wherein the bearing element is configured to plastically deform the interior wall.

7. The interior trim component according to claim 5 wherein the piston is configured to move from the deployed position to a compressed position at a predetermined compressive load.

8. The interior trim component according to claim 7 further comprising an interior tube disposed between the piston and the impact plate.

9. The interior trim component according to claim 5 further comprising an interior trim fascia.

10. The interior trim component according to claim 1 further comprising a controller configured to provide a signal to the gas generator upon predetermined amount of deceleration within the vehicle.

11. A vehicle instrument panel comprising:
a cross car beam;
a cylinder having an interior wall, the interior,wall defining a cavity coupled to the cross-car beam;
a single-use gas generator fluidly coupled to the cavity;
a piston disposed within the cavity, the piston being movable from a non-deployed position to a deployed position, the piston defining a ramp and the piston having a locking mechanism comprising at least one spherical bearing element configured to restrain movement of the piston within the cavity when subjected to a first compressive force;
a knee bolster being coupled to the piston by a member, said cylinder configured to buckle when subjected to a second compressive force, said second compressive force being greater than the first compressive force;
wherein a difference between said first compressive force and said second compressive force and an energy absorption from the cross car beam provide a relatively steady state load against an occupant's knees to retain said occupant's knees during a crash event;
wherein the gas generator is configured to inject gas into the cavity so as to move the piston from the non-deployed position to the deployed position and wherein the moveable piston is moveable from the deployed position to a compressed position during said crash event.

12. The instrument panel according to claim 11 further comprising a cylindrical tube defined between the piston and the impact plate.

13. The instrument panel according to claim 11 wherein the bearing is configured to engage the interior wall when the piston is moved from the deployed position to the compressed position.

14. The instrument panel according to claim 13 wherein the spherical bearing is configured to plastically deform the interior wall.

15. The instrument panel according to claim 13 wherein the piston is configured to move from the deployed position to the non-deployed position at a predetermined load.

16. The instrument panel according to claim 15 further comprising an interior tube disposed between the piston and the impact plate.

17. The instrument panel according to claim 16 further comprising an interior trim fascia.

* * * * *